United States Patent
Grebe et al.

(10) Patent No.: US 11,926,258 B2
(45) Date of Patent: Mar. 12, 2024

(54) VEHICLE AMBIENT LIGHTING

(71) Applicant: Honda Motor Co., Ltd., Tokyo (JP)

(72) Inventors: Cody D. Grebe, Marysville, OH (US); Cooper Koo Shin, Huntington Beach, CA (US); Tony Da-Tung Wang, Marysville, OH (US); Ross Cameron Miller, Plain City, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 51 days.

(21) Appl. No.: 17/703,383

(22) Filed: Mar. 24, 2022

(65) Prior Publication Data

US 2023/0302991 A1    Sep. 28, 2023

(51) Int. Cl.
*B60Q 3/85* (2017.01)
*B60K 35/00* (2006.01)

(52) U.S. Cl.
CPC ............. *B60Q 3/85* (2017.02); *B60K 35/00* (2013.01); *B60K 2370/1438* (2019.05)

(58) Field of Classification Search
CPC ... B60Q 3/85; B60K 35/00; B60K 2370/1438
USPC ........................................................ 701/431
See application file for complete search history.

(56) References Cited

U.S. PATENT DOCUMENTS

| | | | |
|---|---|---|---|
| 8,406,961 B2 | 3/2013 | Pathak et al. | |
| 9,876,994 B2 | 1/2018 | Lickfelt | |
| 9,908,467 B2 * | 3/2018 | Ohashi | B60Q 9/00 |
| 10,409,132 B2 | 9/2019 | Liu et al. | |
| 10,549,607 B2 | 2/2020 | Salter et al. | |
| 10,635,290 B2 | 4/2020 | Piekny et al. | |
| 10,981,500 B2 | 4/2021 | Iwano et al. | |
| 11,061,475 B2 | 7/2021 | Galan Garcia et al. | |
| 2020/0187337 A1 | 6/2020 | Julian et al. | |
| 2020/0401818 A1 | 12/2020 | Gibert Castroverde et al. | |
| 2021/0039551 A1 | 2/2021 | Kawano et al. | |
| 2021/0072892 A1 * | 3/2021 | Lee | B60K 35/00 |
| 2021/0107400 A1 | 4/2021 | Erler et al. | |
| 2022/0402430 A1 * | 12/2022 | Knipp | H05B 47/155 |

FOREIGN PATENT DOCUMENTS

| | | |
|---|---|---|
| DE | 102015209902 | 12/2016 |
| DE | 102017212062 | 1/2019 |
| DE | 102018204796 | 10/2019 |
| KR | 20090082597 | 7/2009 |
| WO | 2021078590 | 4/2021 |

* cited by examiner

*Primary Examiner* — Mahmoud S Ismail
(74) *Attorney, Agent, or Firm* — RANKIN, HILL & CLARK LLP

(57) ABSTRACT

Vehicle ambient lighting may be provided utilizing a touchscreen, a lighting system, a memory, and a processor. The lighting system may include a direct lighting system and an indirect lighting system. The memory may store one or more instructions and the processor may execute one or more of the instructions stored on the memory to perform one or more acts or actions, such as rendering a vehicle ambient lighting interface via the touchscreen or implementing a currently selected vehicle ambient lighting mode via the lighting system. The vehicle ambient lighting interface may include two or more vehicle ambient lighting modes and the currently selected vehicle ambient lighting mode from the two or more vehicle ambient lighting modes.

18 Claims, 13 Drawing Sheets

VEHICLE AMBIENT LIGHTING

BACKGROUND

Generally, vehicles may be equipped with displays, such as center console displays, car dashboard displays (e.g., meter display), touch screen displays, or other displays. These displays may render vehicle information or interfaces for a user, driver, passenger, or other occupant of a vehicle. Human machine interfaces (HMI) in the vehicle may facilitate interaction between a human (e.g., a driver, passenger) in the vehicle and the vehicle or associated vehicle systems. The user interface (UI) design of such systems may provide a self-explanatory, intuitive, efficient, or user-friendly way to operate the vehicle and/or to provide information.

BRIEF DESCRIPTION

According to one aspect, a system for vehicle ambient lighting may include a touchscreen, a lighting system, a memory, and a processor. The lighting system may include a direct lighting system and an indirect lighting system. The memory may store one or more instructions. The processor may execute one or more of the instructions stored on the memory to perform one or more acts or actions, such as rendering a vehicle ambient lighting interface via the touchscreen or implementing a currently selected vehicle ambient lighting mode via the lighting system. The vehicle ambient lighting interface may include two or more vehicle ambient lighting modes and the currently selected vehicle ambient lighting mode from the two or more vehicle ambient lighting modes.

The two or more vehicle ambient lighting modes of the vehicle ambient lighting interface may be rendered in a circular, revolving fashion during selection. A gap may be rendered between a first vehicle ambient lighting mode and a last vehicle ambient lighting mode of the two or more vehicle ambient lighting modes. The currently selected vehicle ambient lighting mode may implement a first color for the direct lighting system and implement a second color for the indirect lighting system.

The touchscreen may receive a user input and the processor may change the currently selected vehicle ambient lighting mode from a first vehicle ambient lighting mode to a second vehicle ambient lighting mode based on the user input. The user input may be a swipe gesture, a selection of an arrow graphic element, or a selection of a second vehicle ambient lighting mode graphic element. The swipe gesture may include a swipe of at least a defined threshold length or a swipe in a predefined direction.

The touchscreen may receive a user input and change the currently selected vehicle ambient lighting mode from a first vehicle ambient lighting mode to a third vehicle ambient lighting mode based on the user input. The user input may be a hold and drag gesture or a hold selection of an arrow graphic element. A first vehicle ambient lighting mode graphic element corresponding to the first vehicle ambient lighting mode may be non-adjacent to a third vehicle ambient lighting mode graphic element corresponding to the third vehicle ambient lighting mode.

According to one aspect, a computer-implemented method for vehicle ambient lighting may include rendering a vehicle ambient lighting interface via a touchscreen and implementing a currently selected vehicle ambient lighting mode via a lighting system. The vehicle ambient lighting interface may include two or more vehicle ambient lighting modes and the currently selected vehicle ambient lighting mode from the two or more vehicle ambient lighting modes.

The computer-implemented method for vehicle ambient lighting may include rendering the two or more vehicle ambient lighting modes of the vehicle ambient lighting interface in a circular, revolving fashion during selection, rendering a gap between a first vehicle ambient lighting mode and a last vehicle ambient lighting mode of the two or more vehicle ambient lighting modes, implementing the currently selected vehicle ambient lighting mode via a direct lighting system and an indirect lighting system of the lighting system, implementing a first color for the direct lighting system and a second color for the indirect lighting system, receiving a user input via the touchscreen, or rendering a changing of the currently selected vehicle ambient lighting mode from a first vehicle ambient lighting mode to a second vehicle ambient lighting mode based on the user input.

According to one aspect, a system for vehicle ambient lighting may include a memory and a processor. The memory may store one or more instructions. The processor may execute one or more of the instructions stored on the memory to perform one or more acts or actions, such as rendering a vehicle ambient lighting interface via a touchscreen or implementing a currently selected vehicle ambient lighting mode via a lighting system. The lighting system may include a direct lighting system and an indirect lighting system. The vehicle ambient lighting interface may include two or more vehicle ambient lighting modes and a currently selected vehicle ambient lighting mode from the two or more vehicle ambient lighting modes.

The two or more vehicle ambient lighting modes of the vehicle ambient lighting interface may be rendered in a circular, revolving fashion during selection. A gap may be rendered between a first vehicle ambient lighting mode and a last vehicle ambient lighting mode of the two or more vehicle ambient lighting modes.

DETAILED DESCRIPTION

Figure 1:
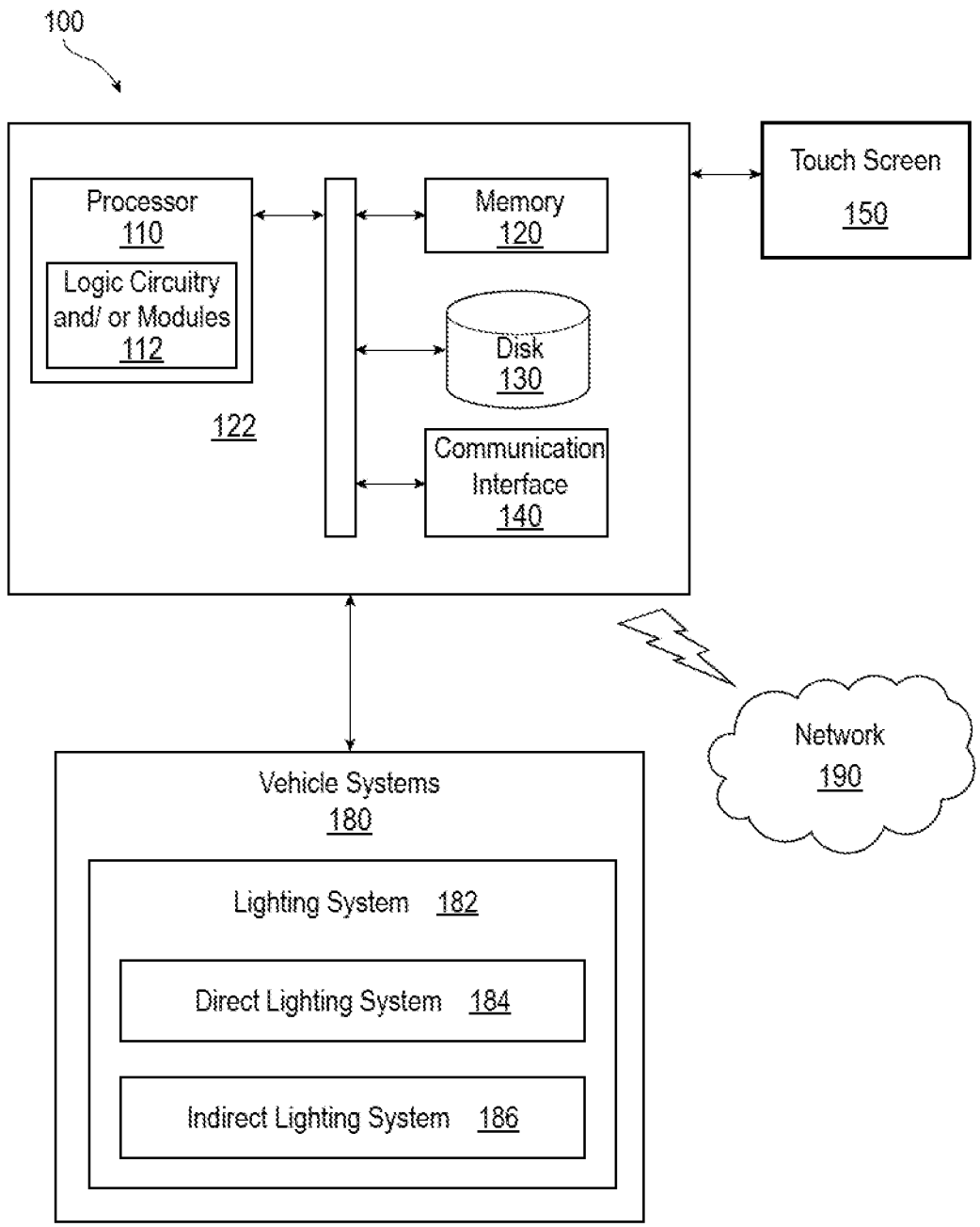
FIG. 1 is an exemplary component diagram of a system for vehicle ambient lighting, according to one aspect.

The following includes definitions of selected terms employed herein. The definitions include various examples and/or forms of components that fall within the scope of a term and that may be used for implementation. The examples are not intended to be limiting. Further, one having ordinary skill in the art will appreciate that the components discussed herein, may be combined, omitted or organized with other components or organized into different architectures.

A "processor", as used herein, processes signals and performs general computing and arithmetic functions. Signals processed by the processor may include digital signals, data signals, computer instructions, processor instructions, messages, a bit, a bit stream, or other means that may be received, transmitted, and/or detected. Generally, the processor may be a variety of various processors including multiple single and multicore processors and co-processors and other multiple single and multicore processor and co-processor architectures. The processor may include various modules to execute various functions.

A "memory", as used herein, may include volatile memory and/or non-volatile memory. Non-volatile memory may include, for example, ROM (read only memory), PROM (programmable read only memory), EPROM (erasable PROM), and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDRSDRAM), and direct RAM bus RAM (DRRAM). The memory may store an operating system that controls or allocates resources of a computing device.

A "disk" or "drive", as used herein, may be a magnetic disk drive, a solid state disk drive, a floppy disk drive, a tape drive, a Zip drive, a flash memory card, and/or a memory stick. Furthermore, the disk may be a CD-ROM (compact disk ROM), a CD recordable drive (CD-R drive), a CD rewritable drive (CD-RW drive), and/or a digital video ROM drive (DVD-ROM). The disk may store an operating system that controls or allocates resources of a computing device.

A "bus", as used herein, refers to an interconnected architecture that is operably connected to other computer components inside a computer or between computers. The bus may transfer data between the computer components. The bus may be a memory bus, a memory controller, a peripheral bus, an external bus, a crossbar switch, and/or a local bus, among others. The bus may also be a vehicle bus that interconnects components inside a vehicle using protocols such as Media Oriented Systems Transport (MOST), Controller Area network (CAN), Local Interconnect Network (LIN), Ethernet, among others.

A "database", as used herein, may refer to a table, a set of tables, and a set of data stores (e.g., disks) and/or methods for accessing and/or manipulating those data stores.

An "operable connection", or a connection by which entities are "operably connected", is one in which signals, physical communications, and/or logical communications may be sent and/or received. An operable connection may include a wireless interface, a physical interface, a data interface, and/or an electrical interface.

A "computer communication", as used herein, refers to a communication between two or more computing devices (e.g., computer, personal digital assistant, cellular telephone, network device) and may be, for example, a network transfer, a file transfer, an applet transfer, an email, a hypertext transfer protocol (HTTP) transfer, and so on. A computer communication may occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

A "mobile device", as used herein, may be a computing device typically having a display screen with a user input (e.g., touch, keyboard) and a processor for computing. Mobile devices include handheld devices, portable electronic devices, smart phones, laptops, tablets, and e-readers.

A "vehicle", as used herein, refers to any moving vehicle that is capable of carrying one or more human occupants and is powered by any form of energy. The term "vehicle" includes cars, trucks, vans, minivans, SUVs, motorcycles, scooters, boats, personal watercraft, and aircraft. In some scenarios, a motor vehicle includes one or more engines. Further, the term "vehicle" may refer to an electric vehicle (EV) that is powered entirely or partially by one or more electric motors powered by an electric battery. The EV may include battery electric vehicles (BEV) and plug-in hybrid electric vehicles (PHEV). Additionally, the term "vehicle" may refer to an autonomous vehicle and/or self-driving vehicle powered by any form of energy. The autonomous vehicle may or may not carry one or more human occupants.

A "vehicle display" or "display" (e.g., when used with reference to a display in a vehicle), as used herein may include, but is not limited to, LED display panels, LCD display panels, CRT displays, plasma display panels, touch screen displays, among others, that are often found in vehicles to display information about the vehicle, such as the touchscreen of FIG. 1, which include display screens. The display may receive input (e.g., touch input, keyboard input, input from various other input devices, and so on.) from a user. The display may be located in various locations of the vehicle, for example, on the dashboard or center console. In some embodiments, the display is part of a portable device (e.g., in possession or associated with a vehicle occupant), a navigation system, an infotainment system, among others. For example, the display unit may be the center console display unit, while the display unit may be the dashboard display unit.

An "input/output device" (I/O device) as used herein may include devices for receiving input and/or devices for outputting data, such as the touchpad or the display unit. The touchpad may include sensors which enable the touchpad to detect a number of fingers a user is using or the touchpad to distinguish between multiple zones. The input and/or output may be for controlling different vehicle features which include various vehicle components, systems, and subsystems. Specifically, the term "input device" includes, but is not limited to: keyboard, microphones, pointing and selection devices, cameras, imaging devices, video cards, displays, push buttons, rotary knobs, and the like. The term "input device" additionally includes graphical input controls that take place within a user interface which may be displayed by various types of mechanisms such as software and hardware based controls, interfaces, touch screens, touch pads, or plug and play devices. An "output device" includes, but is not limited to: display devices, and other devices for outputting information and functions, such as the touchscreen of the system of FIG. 1.

A "vehicle system", as used herein, may be any automatic or manual systems that may be used to enhance the vehicle, and/or driving. Exemplary vehicle systems include an autonomous driving system, an electronic stability control system, an anti-lock brake system, a brake assist system, an automatic brake prefill system, a low speed follow system, a cruise control system, a collision warning system, a collision mitigation braking system, an auto cruise control system, a lane departure warning system, a blind spot indicator system, a lane keep assist system, a navigation system, a transmission system, brake pedal systems, an electronic power steering system, visual devices (e.g., camera systems, proximity sensor systems), a climate control system, an electronic pretensioning system, a monitoring system, a passenger detection system, a vehicle suspension system, a vehicle seat configuration system, a vehicle cabin lighting system, an audio system, a sensory system, among others.

The aspects discussed herein may be described and implemented in the context of non-transitory computer-readable storage medium storing computer-executable instructions. Non-transitory computer-readable storage media include computer storage media and communication media. For example, flash memory drives, digital versatile discs (DVDs), compact discs (CDs), floppy disks, and tape cassettes. Non-transitory computer-readable storage media may include volatile and non-volatile, removable and non-removable media implemented in any method or technology for storage of information such as computer readable instructions, data structures, modules, or other data.

FIG. 1 is an exemplary component diagram of a system 100 for vehicle ambient lighting, according to one aspect. The system 100 for vehicle ambient lighting may include a processor 110, logic circuitry 112 and/or one or more modules, a memory 120, a bus 122, a storage drive 130, a communication interface 140, a touchscreen 150 including a display screen and a touchpad portion which may be integrated on the touchscreen 150, one or more sensors, etc. The system 100 for vehicle ambient lighting may interact with one or more vehicle systems 180 or receive information from other devices over a network enabled via computer communication. One or more of the vehicle systems 180 may be a vehicle ambient lighting system or lighting system 182. The lighting system 182 may include a direct lighting system 184 and an indirect lighting system 186, among others. Direct lighting from the direct lighting system 184 may include accent lighting while indirect lighting from the indirect lighting system 186 may include ambient lighting, which may come from under the dashboard or shine in a footrest area. Respective components of FIG. 1 may be communicatively coupled or operably connected and may be in computer communication with one another.

The memory 120 may store one or more instructions or sets of instructions, such as a set of instructions for execution of a touchscreen interface in operation in accordance with the system 100 for vehicle ambient lighting. According to one aspect, the processor 110 may execute instructions stored on the disk or the memory 120 to run an operating system which enables the use of 'apps' or applications (e.g., application programs, computing programs, or programs) to be run on the system 100 for vehicle ambient lighting. In other words, the operating system enables the user to interact with or run applications which interact with the hardware of the vehicle or other hardware, such as a mobile device of the user. Thus, the processor 110 may render one or more graphic elements which may be selected by use of the touchscreen 150 by a user. An example of the operating system may be seen in FIGS. 3A-3C.

Additionally, the memory 120 or storage drive 130 may download, via the communication interface 140 and network, and/or store one or more vehicle ambient lighting modes. For example, each mode may have one or more associated colors one or more associated lighting changes, one or more schemes, etc. According to one aspect, the direct lighting system 184 may be associated with a first color and the indirect lighting system 186 may be associated with a second color for a given vehicle ambient lighting mode.

The processor 110 may execute one or more of the instructions stored on the memory 120 to perform one or more acts or actions, such as rendering a vehicle ambient lighting interface via the touchscreen 150 or implementing a currently selected vehicle ambient lighting mode via the lighting system 182.

According to one aspect, the interface of the operating system may have an always active selection or always have a currently selected graphic element corresponding to a vehicle ambient lighting mode. In other words, one of the graphic elements for a corresponding vehicle ambient lighting mode may be constantly selected, thereby mitigating the use of a mouse pointer, for example. According to another aspect, a pointer may be rendered by the processor 110 within the operating system interface.

The vehicle ambient lighting interface may include a screen where two or more vehicle ambient lighting modes are rendered by the processor 110. Each one of the two or more vehicle ambient lighting modes may be represented by a graphic element (e.g., a first vehicle ambient lighting mode graphic element, a second vehicle ambient lighting mode graphic element, a third vehicle ambient lighting mode graphic element, etc.). According to one aspect, one of the vehicle ambient lighting modes from the two or more vehicle ambient lighting modes may be a currently selected vehicle ambient lighting mode. In other words, the vehicle ambient lighting interface may include two or more rendered vehicle ambient lighting mode graphic elements and a rendering of the currently selected vehicle ambient lighting mode from the two or more vehicle ambient lighting modes. The currently selected vehicle ambient lighting mode may be indicated by rendering a bold box around the selected vehicle ambient lighting mode, highlighting the selected vehicle ambient lighting mode, centering the selected vehicle ambient lighting mode on the display, dimming non-selected selected vehicle ambient lighting modes, etc.

According to one aspect, the two or more vehicle ambient lighting modes of the vehicle ambient lighting interface may be rendered in a circular, revolving fashion during selection. In other words, as a user views all of the vehicle ambient lighting modes from the corresponding graphic elements, the graphic elements corresponding to the vehicle ambient lighting modes may appear to rotate or roll over in a rolodex fashion. In this way, the vehicle ambient lighting modes may be rendered in a carousel-style touchscreen interface for selecting an interior ambient lighting for a vehicle. Explained yet again, the processor 110 may render multiple vehicle ambient lighting modes to be available for preview in the secondary portions of the presentation area 210 as a 'train' of graphic elements. Thus, the visible screen area of the primary, center portion of the presentation area 210 may act as a lens, displaying the currently selected vehicle ambient lighting mode at a given time. Based on user input from the touchpad, a scrolling input (e.g., a user input associated with a scroll command, such as a swipe, a selection of the adjacent graphic element, a selection of an arrow graphic element) may cause the processor 110 to render a transition between vehicle ambient lighting modes in the vehicle ambient lighting mode carousel and render different vehicle ambient lighting modes within the secondary portions of the presentation area 210.

According to yet another aspect, the processor 110 may implement the lighting scheme associated with an adjacent vehicle ambient lighting mode in corresponding fashion within the vehicle during the selection process. For example, if a currently selected vehicle ambient lighting mode is green, a vehicle ambient lighting mode directly adjacent to the left is blue, and a vehicle ambient lighting mode directly adjacent to the right is red. The processor 110 may implement the currently selected vehicle ambient lighting mode as green using the lighting system 182. Additionally, the processor 110 may partially implement the vehicle ambient lighting mode directly adjacent to the left by having some lights of the lighting system 182 on the left of the vehicle (e.g., left door lights, left head-up-display (HUD), left blinker, etc.) flash blue temporarily (e.g., until a press and hold is released or for a threshold duration, such as one second). Similarly, the processor 110 may partially implement the vehicle ambient lighting mode directly adjacent to the right by having some lights of the lighting system 182 on the right of the vehicle flash red temporarily.

For example, if there are three vehicle ambient lighting modes (i.e., a first vehicle ambient lighting mode, a second vehicle ambient lighting mode, and a third vehicle ambient lighting mode), the first vehicle ambient lighting mode may appear centered within the vehicle ambient lighting interface with the other two vehicle ambient lighting modes to the right to start. Alternatively, the first vehicle ambient lighting mode may appear centered within the vehicle ambient lighting interface between the other two vehicle ambient lighting modes to the right to start. As the user scrolls through the different vehicle ambient lighting modes, the second vehicle ambient lighting mode may appear centered within the vehicle ambient lighting interface with the first vehicle ambient lighting mode on the left and the third vehicle ambient lighting mode on the right. When the user reaches the third vehicle ambient lighting mode, this third vehicle ambient lighting mode may appear centered within the vehicle ambient lighting interface with both the first vehicle ambient lighting mode and the second vehicle ambient lighting mode on the left of the third vehicle ambient lighting mode. In this way, two or more vehicle ambient lighting modes of the vehicle ambient lighting interface may be rendered in a circular, revolving fashion during selection of the vehicle ambient lighting modes.

In order to cycle through and view each vehicle ambient lighting mode in the secondary portions of the presentation area 210 on the display screen, the user may use a swipe gesture on the surface of the touchpad to scroll through the currently selected vehicle ambient lighting mode or vehicle ambient lighting modes. For example, a horizontal swipe input, a press of an arrow graphic element, etc. received at the touchscreen 150 may cause the processor 110 to render a different vehicle ambient lighting mode in the secondary portions of the presentation area 210 based on a predetermined order and to change the currently selected vehicle ambient lighting mode from one vehicle ambient lighting mode to another vehicle ambient lighting mode (e.g., an adjacent vehicle ambient lighting mode or a non-adjacent vehicle ambient lighting mode based on a received user input from the touchscreen 150).

When multiple vehicle ambient lighting modes may be available, multiple corresponding graphic elements may be rendered virtually adjacent to one another. However, according to one aspect, a gap 350 may be rendered between a first vehicle ambient lighting mode and a last vehicle ambient lighting mode of the two or more vehicle ambient lighting modes, while no gaps are rendered between other vehicle ambient lighting modes. For example, if there are three vehicle ambient lighting modes (i.e., a first vehicle ambient lighting mode, a second vehicle ambient lighting mode, and a third vehicle ambient lighting mode), the first vehicle ambient lighting mode may appear centered within the vehicle ambient lighting interface between the third vehicle ambient lighting mode on the left and the second vehicle ambient lighting mode on the right with the gap 350 being rendered between the first vehicle ambient lighting mode and the third (e.g., last) vehicle ambient lighting mode.

According to one aspect, the touchscreen 150 may receive user inputs (e.g., touch inputs) and the processor 110 may change the currently selected vehicle ambient lighting mode from a first vehicle ambient lighting mode to another vehicle ambient lighting mode (e.g., a second vehicle ambient lighting mode, a third vehicle ambient lighting mode, a fourth vehicle ambient lighting mode, etc.) based on the user input. Examples of different types of user inputs which may be received include a swipe gesture anywhere on the touch screen, multiple finger swipes, a selection of an arrow graphic element (e.g., a selection of a left arrow graphic element or a selection of a right arrow graphic element), or a selection of another vehicle ambient lighting mode graphic element, etc. The processor 110 may implement the currently selected vehicle ambient lighting mode as selected.

Further, when passing through a selection, the processor 110 may implement one or more of the non-selected, transition vehicle ambient lighting modes prior to implementing the currently selected vehicle ambient lighting mode. This transition may or may not be implemented based on a type of user input received. For example, for a multiple finger swipe, implementation of one or more of the non-selected, transition vehicle ambient lighting modes may not occur while a single finger swipe may result in implementation of one or more of the non-selected, transition vehicle ambient lighting modes prior to implementing the currently selected vehicle ambient lighting mode.

As another example, if the user swipes from a first vehicle ambient lighting mode to a third vehicle ambient lighting mode, and a second vehicle ambient lighting mode exists between the first vehicle ambient lighting mode and the third vehicle ambient lighting mode, the processor 110 may, at the start of this scenario, implement the first vehicle ambient lighting mode. After the swipe input is received, the processor 110 may temporarily and/or as a transition, implement the second vehicle ambient lighting mode via the lighting system 182. In other words, the processor 110 may queue vehicle ambient lighting modes for execution when displayed in secondary portions of the presentation area 210. After a threshold amount of time, the processor 110 may implement the third vehicle ambient lighting mode utilizing the lighting system 182. The display of the touchscreen 150 may reflect this swipe by animating the transition from the first vehicle ambient lighting mode, to the second vehicle ambient lighting mode, to the third vehicle ambient lighting mode.

In the above example, touchscreen 150 may receive the user input and change the currently selected vehicle ambient lighting mode from the first vehicle ambient lighting mode to the third vehicle ambient lighting mode based on the user input. Here, the user input may be a hold and drag gesture for less than a threshold distance, a hold selection of an arrow graphic element, a swipe gesture, etc. The first vehicle ambient lighting mode graphic element corresponding to the first vehicle ambient lighting mode may be non-adjacent to the third vehicle ambient lighting mode graphic element corresponding to the third vehicle ambient lighting mode because the second vehicle ambient lighting mode graphic element corresponding to the second vehicle ambient lighting mode may be located therebetween. According to one aspect, when a hold and drag gesture is received at the touchscreen 150, the processor 110 may update the currently selected vehicle ambient lighting mode prior to the hold and drag gesture being completed. In other words, the processor 110 may implement the change from the first vehicle ambient lighting mode to another vehicle ambient lighting mode prior to the user even releasing the hold and drag gesture.

According to one aspect, when any hold gesture (e.g., including the hold and drag gesture) is received at the touchscreen 150, non-currently selected lighting mode graphic elements may be rendered to be shrunk in size relative to the currently selected lighting mode graphic element. The amount of shrinking or the scale associated with the shrinking may be based on the scroll speed of a hold and drag gesture. Additionally, when that hold gesture is released, the non-currently selected lighting mode graphic elements which were rendered to be shrunk in size may be rendered to return to their original sizes.

According to one aspect, the currently selected vehicle ambient lighting mode may be rendered using two or more colors. For example, a first portion of the graphic element corresponding to the currently selected vehicle ambient lighting mode may be rendered using a first color and a second portion of the graphic element corresponding to the currently selected vehicle ambient lighting mode may be rendered using a second color. These two colors may reflect the implementation within the system 100 for vehicle ambient lighting. For example, the lighting system 182 of the system 100 for vehicle ambient lighting may include a first lighting subsystem, such as the direct lighting system 184, and a second lighting subsystem, such as the indirect lighting system 186. According to this aspect, the processor 110 may implement the currently selected vehicle ambient lighting mode by implementing the first color for the direct lighting system 184 and implementing the second color for the indirect lighting system 186.

Figure 2:
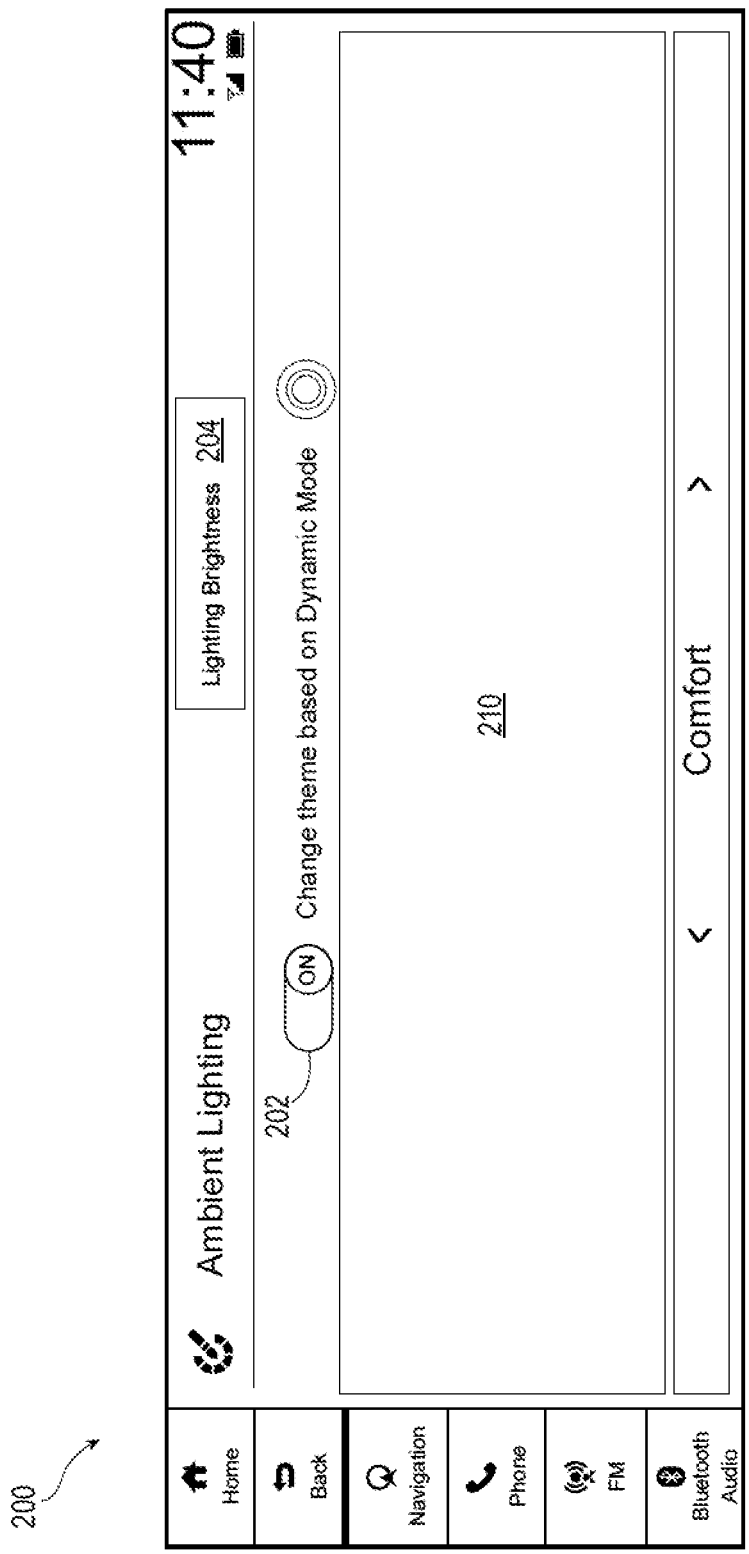
FIG. 2 is an exemplary illustration of an interface associated with the system for vehicle ambient lighting of FIG. 1, according to one aspect.

FIG. 2 is an exemplary illustration of an interface 200 associated with the system 100 for vehicle ambient lighting of FIG. 1, according to one aspect. In FIG. 2, the vehicle ambient lighting interface 200 may include a first graphic element 202, a second graphic element 204, and a presentation area 210. The first graphic element 202 may be an on/off graphic element which toggles between changing the current vehicle ambient lighting mode based on a current driving mode (e.g., sport mode, eco mode, comfort mode, etc.) and enabling a user to select the current vehicle ambient lighting mode from two or more vehicle ambient lighting modes presented or rendered within the presentation area 210. In FIG. 2, the "change theme based on dynamic mode" is toggled to on, and thus, the system 100 for vehicle ambient lighting may manage or change the current vehicle ambient lighting mode automatically, based on a detected current driving mode. If the touchscreen 150 receives a touch input, such as a tap or a press at the first graphic element, the system 100 for vehicle ambient lighting may enable the user to select the current vehicle ambient lighting mode from two or more vehicle ambient lighting modes presented or rendered within the presentation area 210, as described in FIGS. 3A-3C below.

Figure 4:
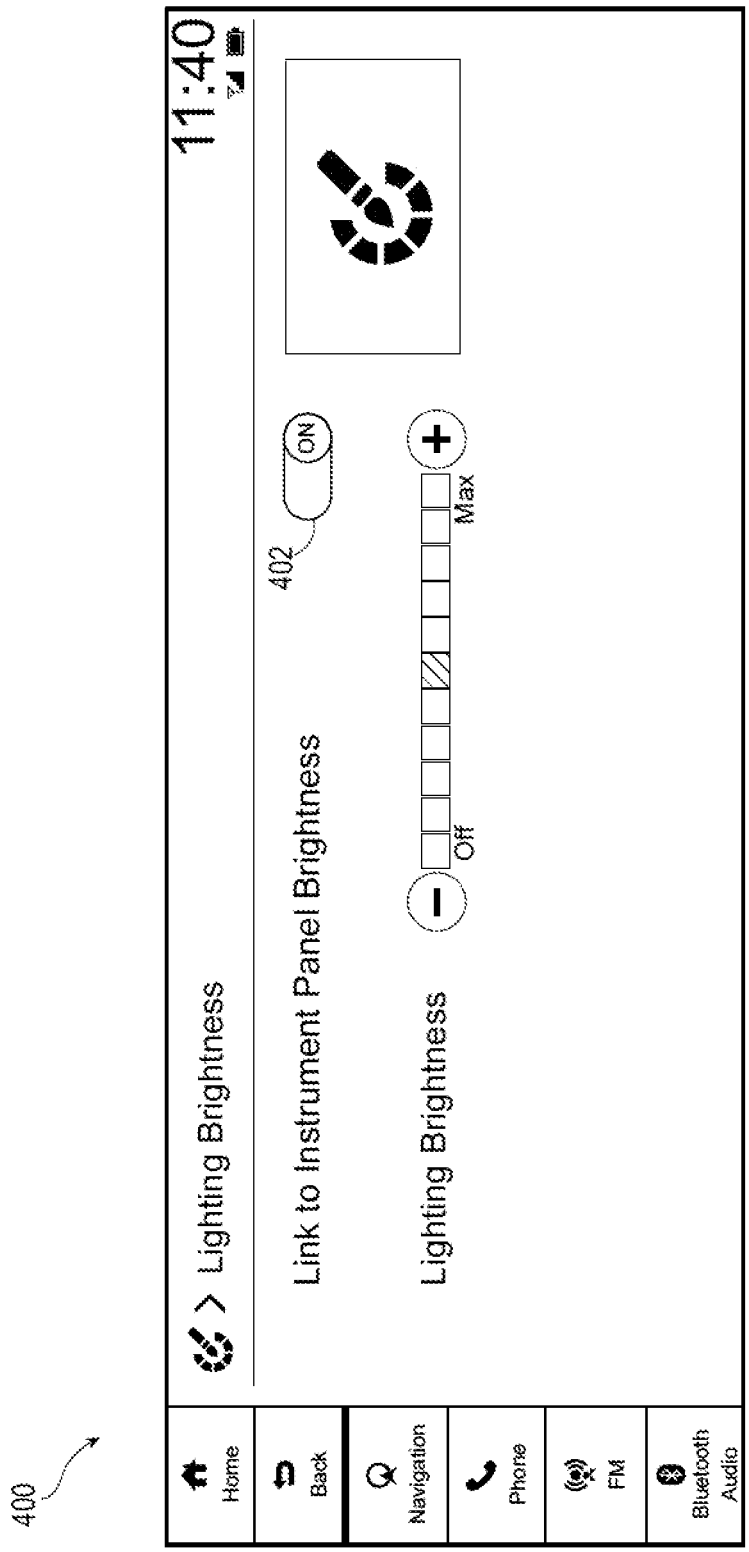
FIG. 4 is an exemplary illustration of an interface associated with the system for vehicle ambient lighting of FIG. 1, according to one aspect.
Figure 5:
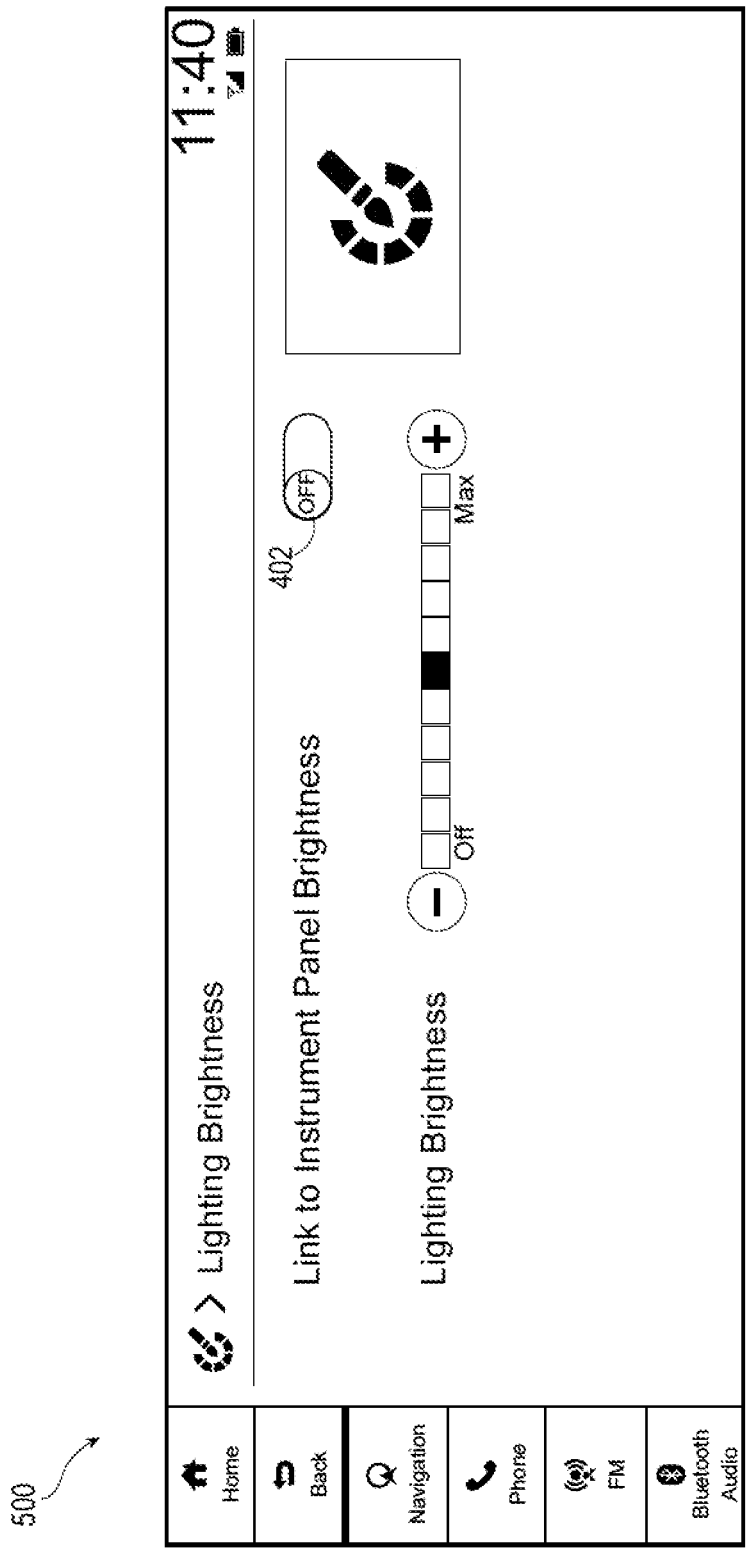
FIG. 5 is an exemplary illustration of an interface associated with the system for vehicle ambient lighting of FIG. 1, according to one aspect.

If the touchscreen 150 receives a touch input, such as a tap or a press at the second graphic element 204, which may be a lighting brightness graphic element, the system 100 for vehicle ambient lighting may enable customized brightness adjustments, as discussed in FIGS. 4-5.

Figure 3A:
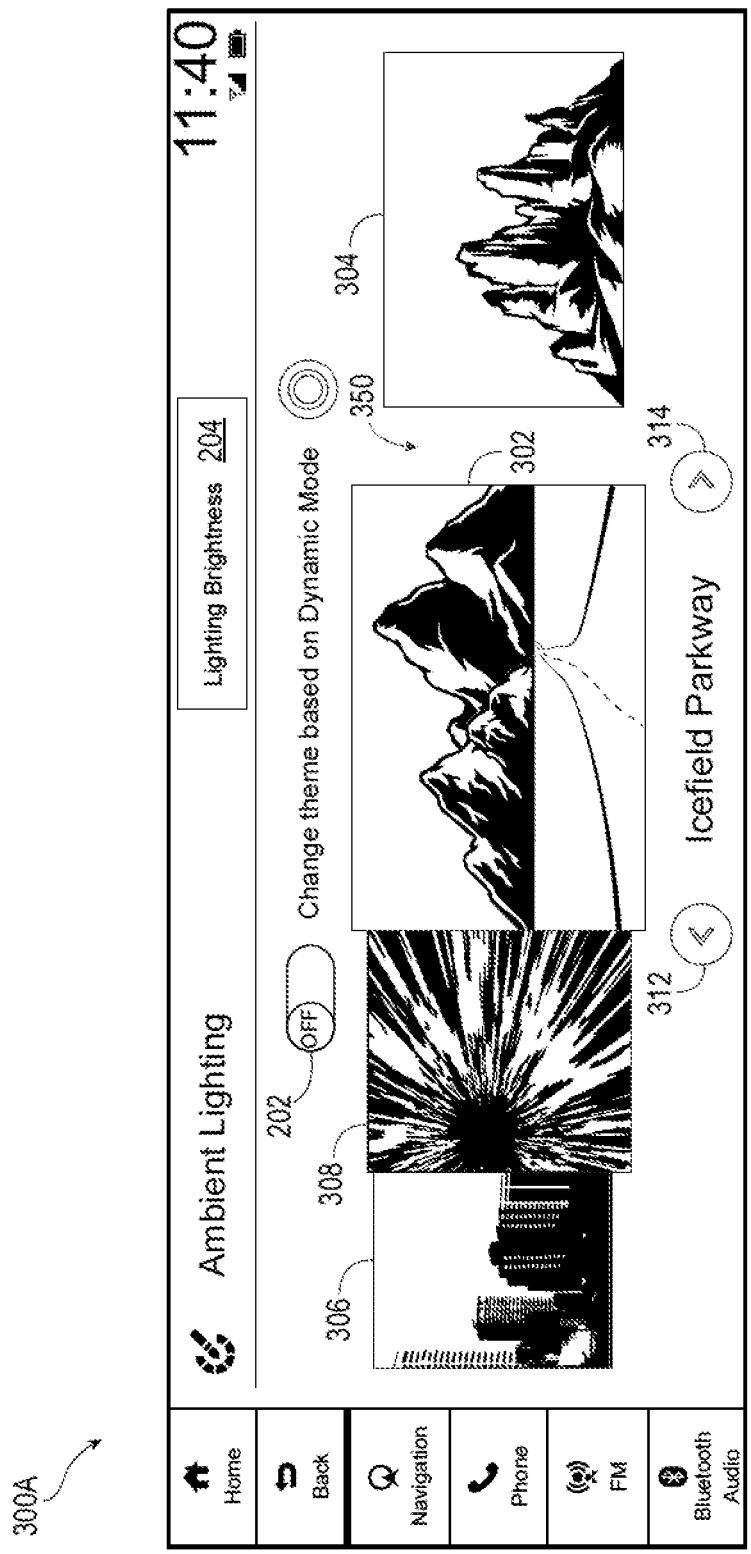
FIG. 3A-3C are exemplary illustrations of an interface associated with the system for vehicle ambient lighting of FIG. 1, according to one aspect.
Figure 3B:
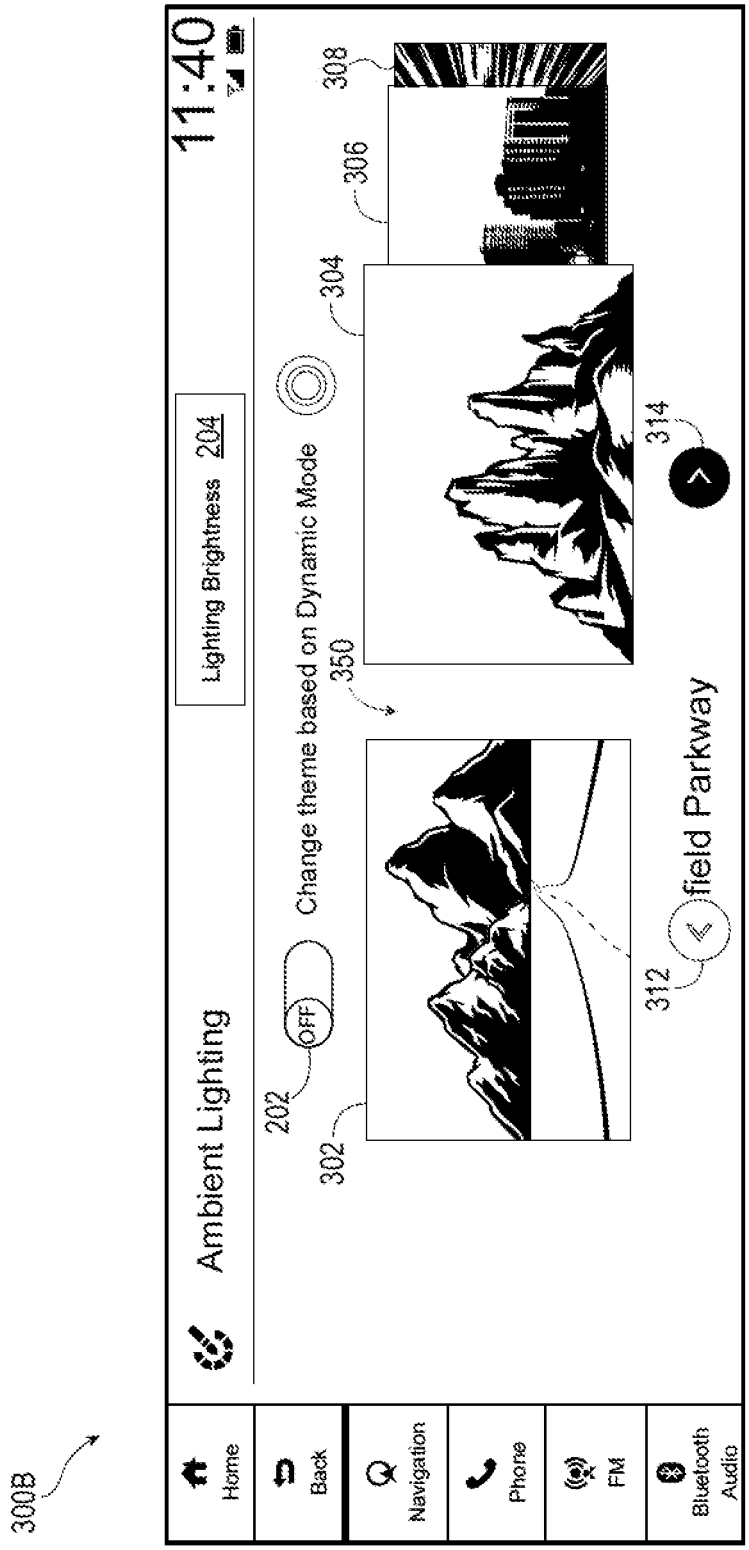
Figure 3C:
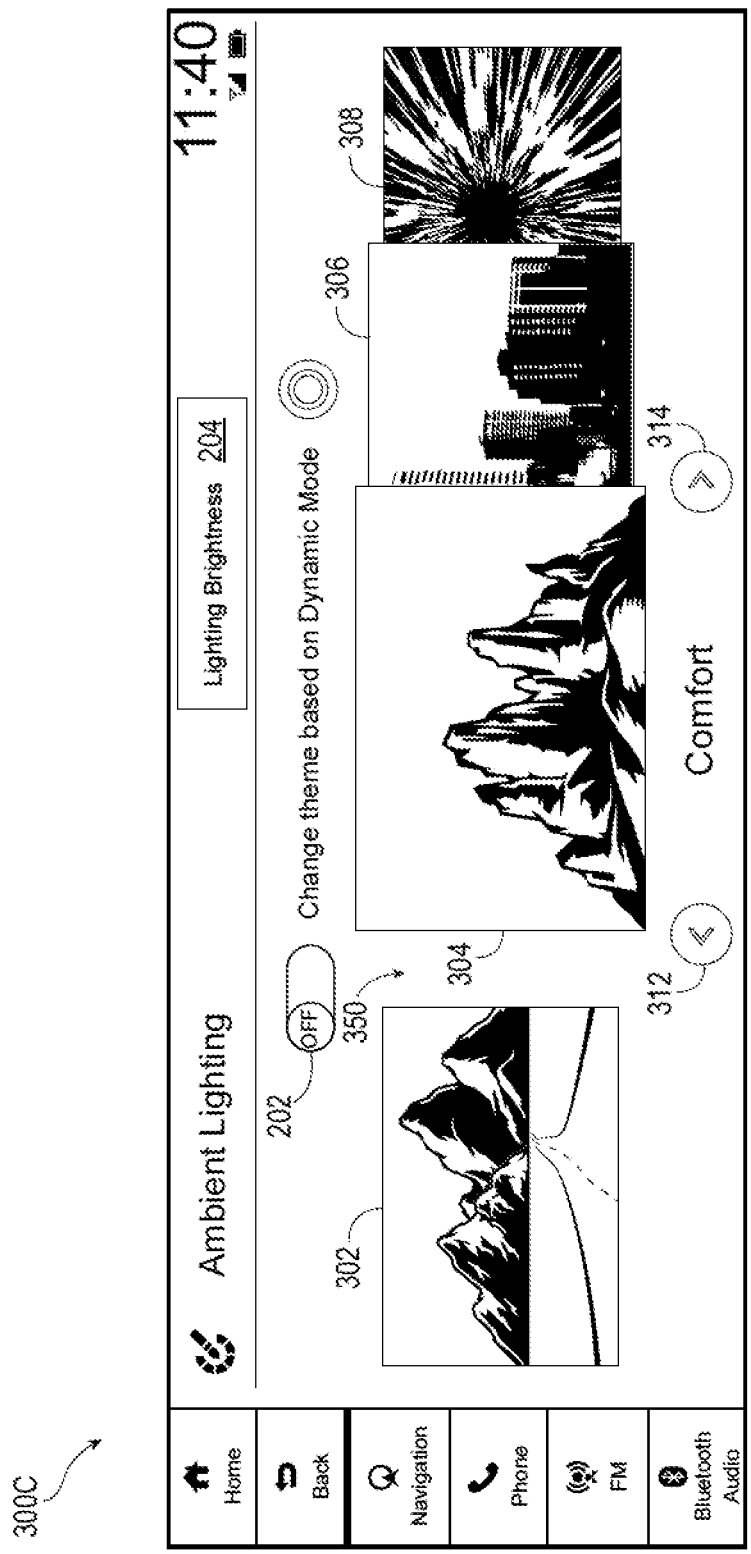

FIG. 3A-3C are exemplary illustrations of an interface 300A, 300B, 300C, respectively, associated with the system 100 for vehicle ambient lighting of FIG. 1, according to one aspect. In FIG. 3A, it can be seen that the first graphic element or the on/off graphic element is toggled off, thus resulting in the system 100 for vehicle ambient lighting to operate in customizable vehicle ambient lighting mode, where the user may select the current vehicle ambient lighting mode from two or more vehicle ambient lighting modes. In FIG. 3A, four vehicle ambient lighting modes (i.e., graphic elements corresponding to a first vehicle ambient lighting mode 302, a second vehicle ambient lighting mode 304, a third vehicle ambient lighting mode 306, and a fourth vehicle ambient lighting mode 308) are depicted.

As seen in FIGS. 3A-3C, the first vehicle ambient lighting mode is the currently selected vehicle ambient lighting mode. This may be indicated by the fact that the graphic element for the first vehicle ambient lighting mode 302 is centered within the presentation area 210 and is larger than the other three vehicle ambient lighting modes. Further, the processor 110 may render the graphic element for the first vehicle ambient lighting mode 302 to be highlighted. Additionally, the processor 110 may implement features of the first, currently selected vehicle ambient lighting mode via the lighting system 182 by illuminating the lighting system 182 using colors according to the currently selected vehicle ambient lighting mode.

In other words, the memory 120 or the disk of the system 100 for vehicle ambient lighting may store instructions which are associated with a lighting system application. For example, some of the instructions associated with a program or an application may, when executed by the processor 110, run the lighting system application in a first mode (e.g., automatic mode based on the current driving mode). Other instructions, when executed, may run the lighting system application in a second mode (e.g., customizable mode based on a user selected theme from one of FIGS. 3A-3C or FIGS. 6A-6C). According to one aspect, the processor 110 may select the mode in which to execute the lighting system application based on a status related to the graphic element 202 or a user input to the touchscreen 150 at graphic element 202, as described above with reference to FIG. 2.

As previously discussed, the touchscreen 150 may accept or receive one or more user inputs which enable selection or scrolling through of the different vehicle ambient lighting modes. Examples of different types of user inputs which may be received include a swipe gesture anywhere on the touch screen, a selection of an arrow graphic element (e.g., a selection of a left arrow graphic element 312 or a selection of a right arrow graphic element 314), or a selection of another vehicle ambient lighting mode graphic element, etc. When a smaller swipe gesture (e.g., less than a threshold distance swiped), a selection of the arrow graphic element, or selection of an adjacent vehicle ambient lighting mode graphic element occurs or is received by the touchscreen 150, the processor 110 may render animation from the first vehicle ambient lighting mode graphic element 302 to a second vehicle ambient lighting mode graphic element 304, depending on or based on the direction of the swipe, which arrow (i.e., left or right) graphic element is selected, or which adjacent vehicle ambient lighting mode graphic element is selected.

Additionally, the processor 110 may render the gap 350 between the first vehicle ambient lighting mode graphic element 302 and the last vehicle ambient lighting mode graphic element. In FIGS. 3A-3C, the first vehicle ambient lighting mode graphic element is indicated by 302 while the last vehicle ambient lighting mode graphic element is indicated by 304. In FIG. 3B, it may be seen that the right arrow graphic element 314 is highlighted, thereby denoting selection or a press and hold of the right arrow graphic element 314.

FIG. 4 is an exemplary illustration of an interface 400 associated with the system 100 for vehicle ambient lighting of FIG. 1, according to one aspect. In FIG. 4, a graphic element associated with automatic brightness levels is depicted at 402. According to one aspect, when the link to instrument panel brightness graphic element 402 is on, the brightness levels may be automatically controlled by the processor 110 in accordance with the driving mode or in accordance with the default instrument panel brightness levels. If a user input is received at the graphic element 402 associated with automatic brightness levels, the system 100 for vehicle ambient lighting may enable customized brightness levels for the lighting system 182, as seen in FIG. 5.

FIG. 5 is an exemplary illustration of an interface 500 associated with the system 100 for vehicle ambient lighting of FIG. 1, according to one aspect. When the link to instrument panel brightness graphic element 402 is off, the brightness levels may be controlled by the processor 110 in accordance the slider bar shown in FIG. 5, which may be manually adjusted by the user based on touch inputs received at the touchscreen 150. For example, the user may slide the brightness indicator left or right to decrease or increase the brightness.

Figure 6A:
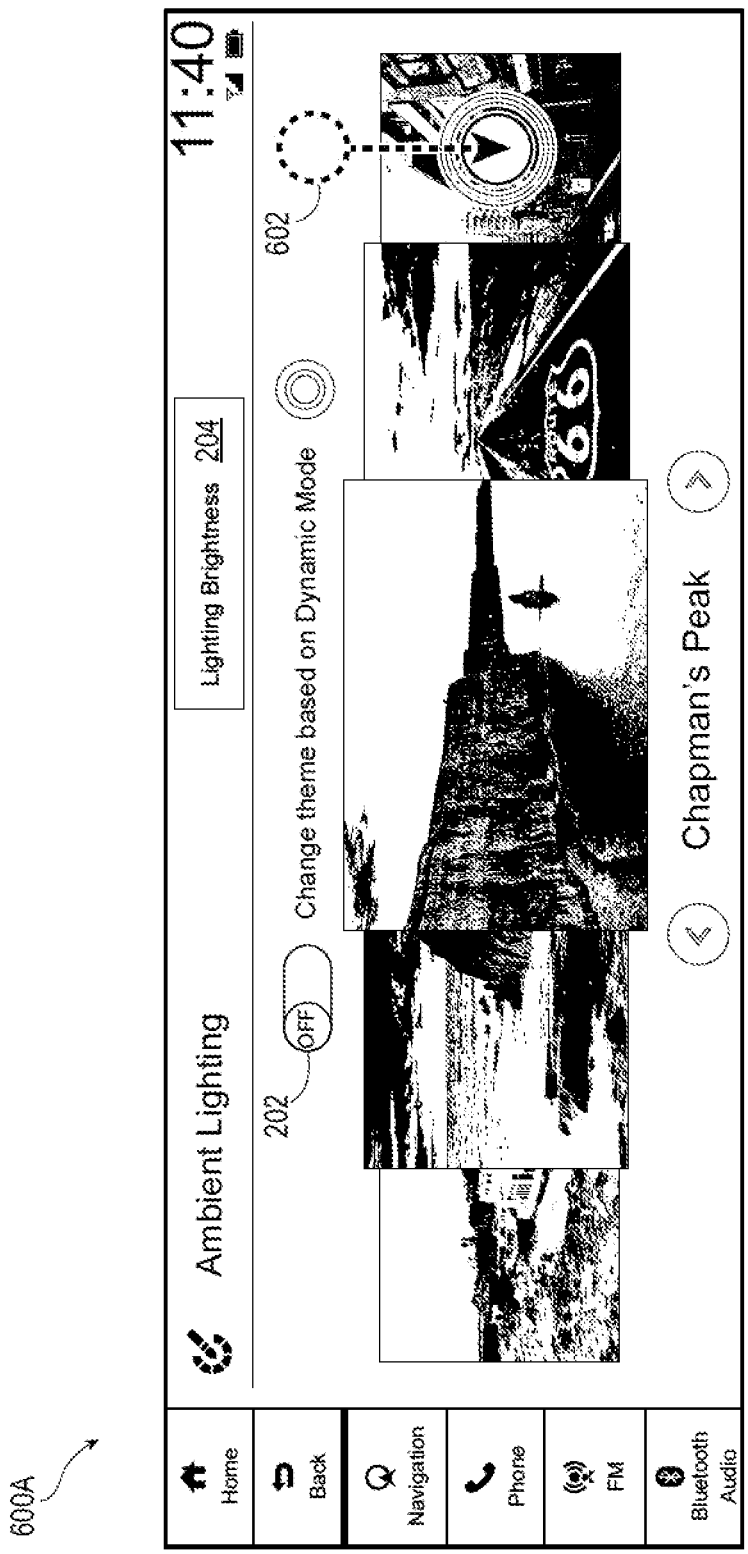
FIG. 6A-6C are exemplary illustrations of an interface associated with the system for vehicle ambient lighting of FIG. 1, according to one aspect.
Figure 6B:
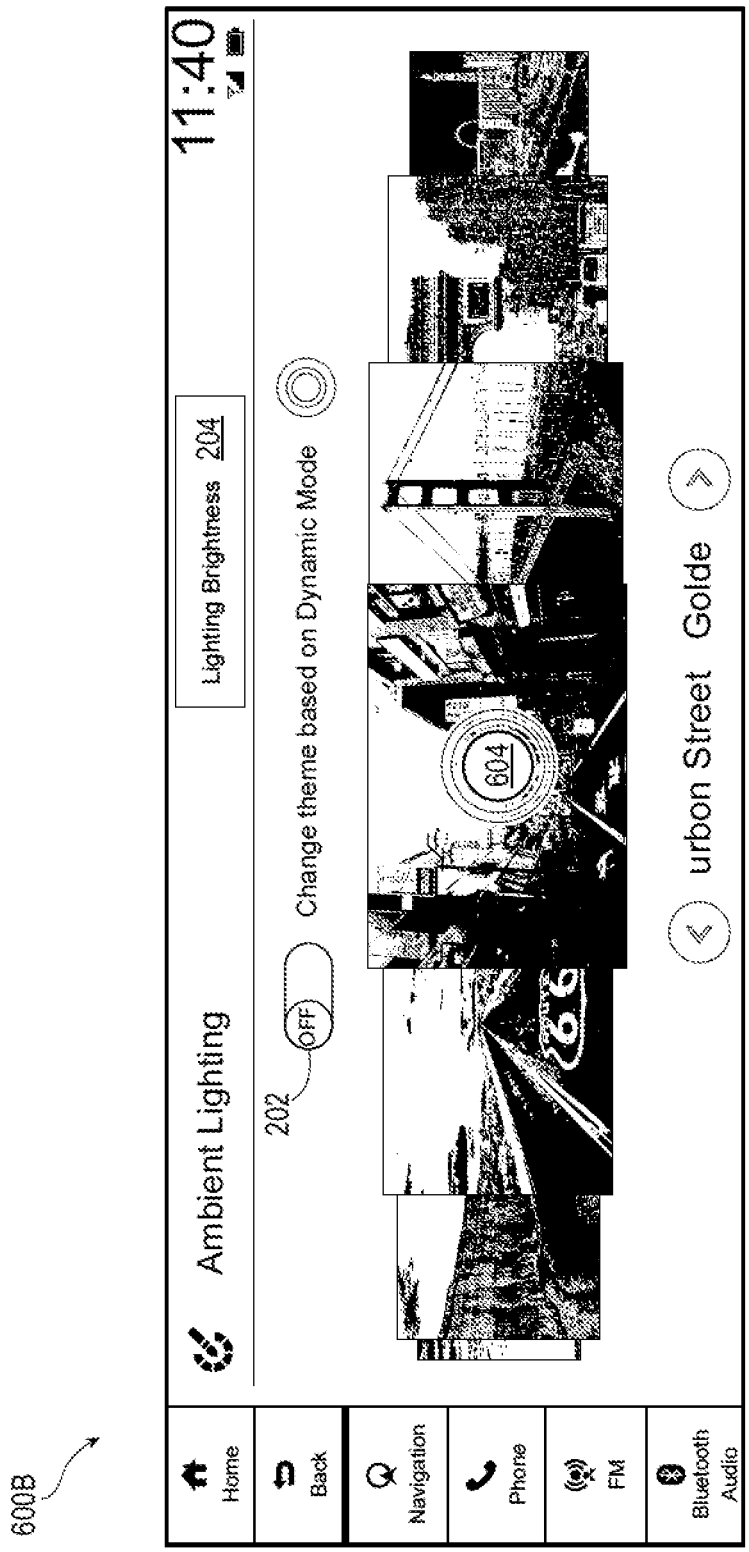
Figure 6C:
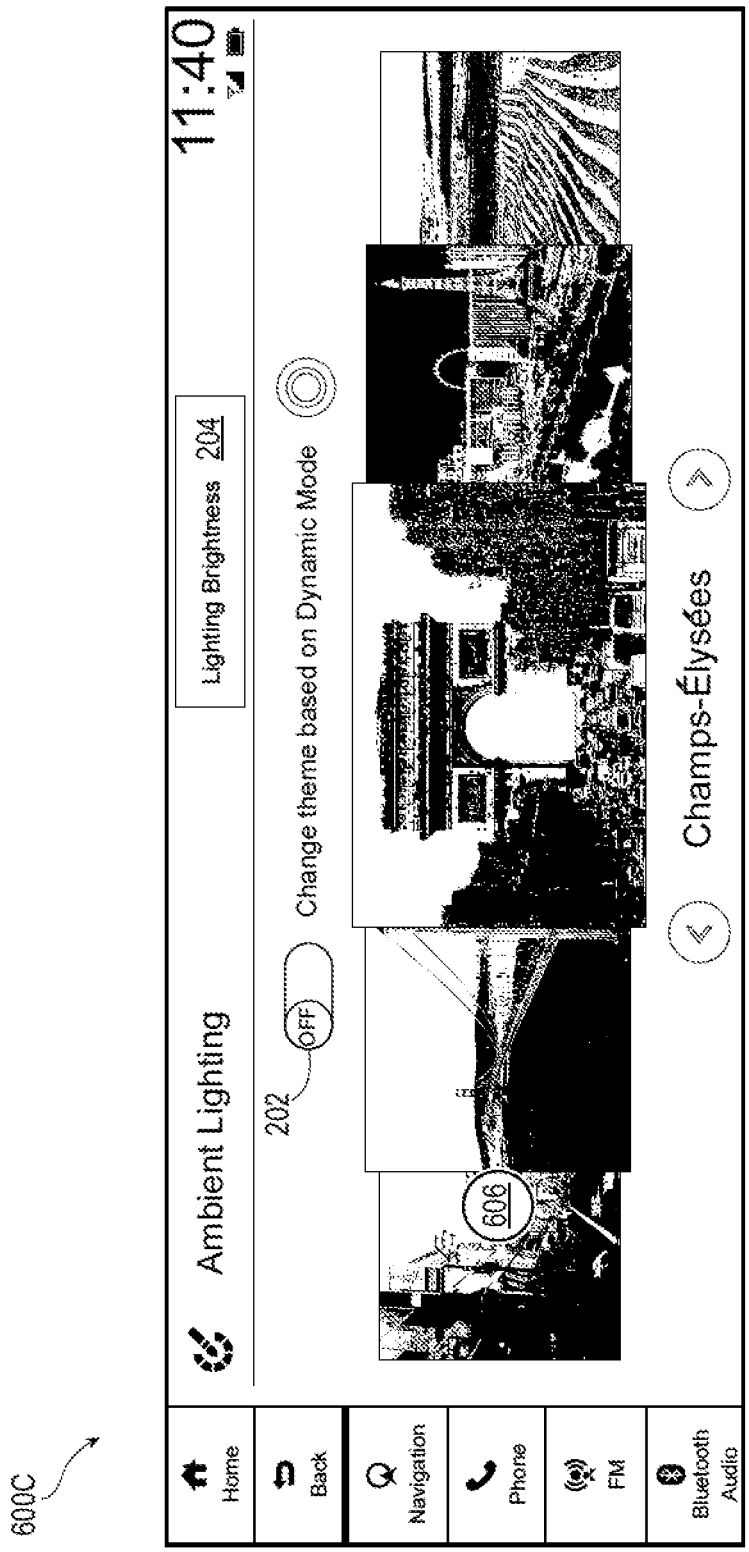

FIG. 6A-6C are exemplary illustrations of an interface 600A, 600B, 600C, respectively, associated with the system 100 for vehicle ambient lighting of FIG. 1, according to one aspect. FIGS. 6A-6C are similar to FIGS. 3A-3C, except that the user input being provided in these figures is depicted at 602, 604, and 606. Here, a long swipe (e.g., greater than a threshold swipe distance is provided) and the processor 110 may render a greater amount of movement or scrolling between vehicle ambient lighting mode graphic elements, such as from a first vehicle ambient lighting mode graphic element to a third vehicle ambient lighting mode graphic element or from a first vehicle ambient lighting mode graphic element to a fourth vehicle ambient lighting mode graphic element, etc. The movement between vehicle ambient lighting mode graphic elements may be based on the swipe distance or pressure associated with the swipe input.

As discussed above, the processor 110 may implement one or more of the non-selected, transition vehicle ambient lighting modes prior to implementing the final, currently selected vehicle ambient lighting mode. For example, in FIG. 6A, "Chapman's Peak" is the currently selected vehicle ambient lighting mode, while in FIG. 6C, "Champs-Élysées" is the currently selected vehicle ambient lighting mode. As seen in FIG. 6A, the swipe gesture may begin at the right side of the presentation area 210 at 602, transition through 604 at FIG. 6B, and finish at through 606 at FIG. 6C. Initially, the processor 110 may implement the lighting mode or scheme for "Chapman's Peak" via the lighting system 182, thereafter, the processor 110 may implement "Bourbon Street" from FIG. 6B. Finally, the processor 110 may implement the currently selected vehicle ambient lighting mode of "Champs-Élysées" from FIG. 6C.

Figure 7:
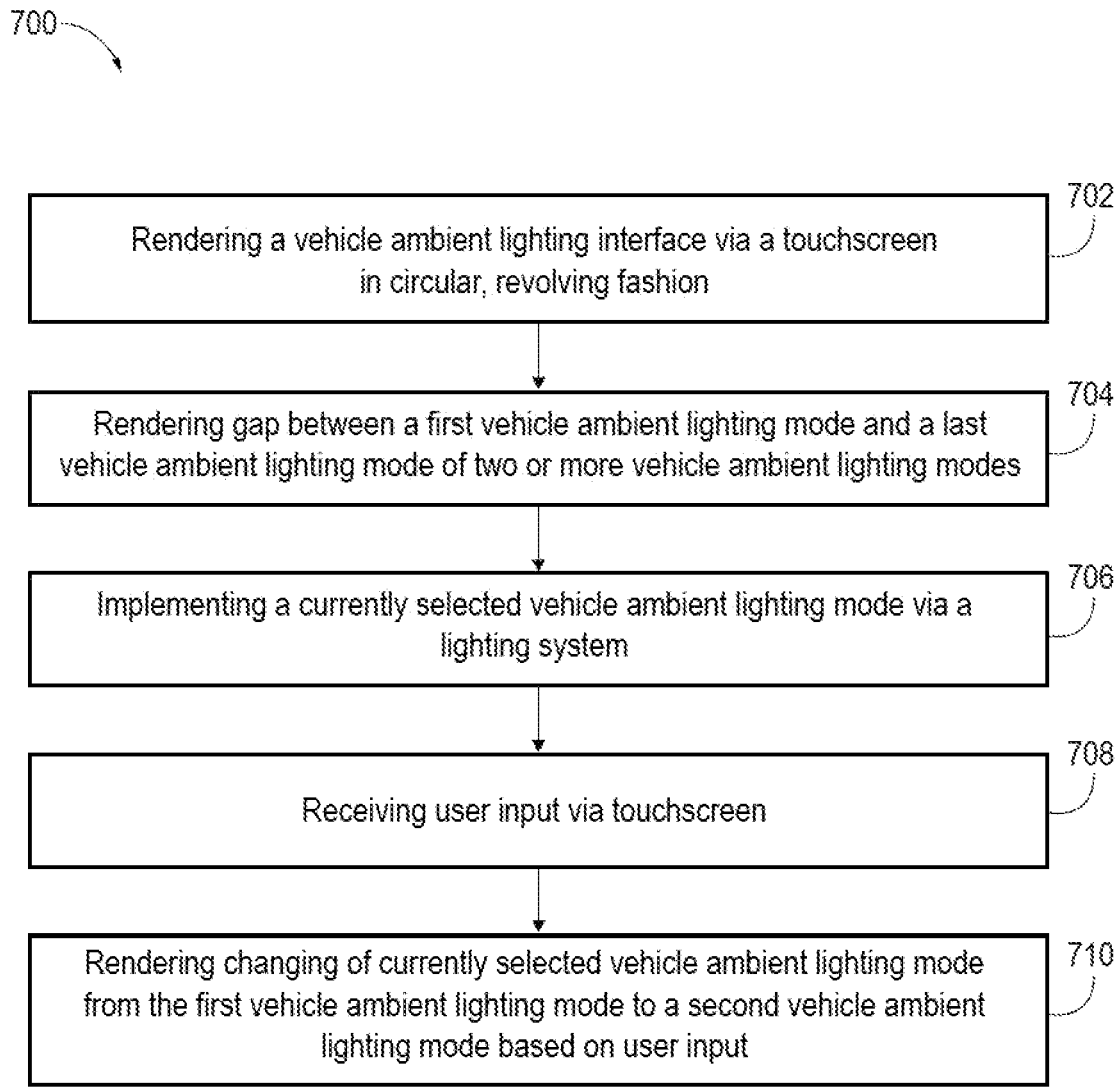
FIG. 7 is an exemplary flow diagram of a method for vehicle ambient lighting, according to one aspect.

FIG. 7 is an exemplary flow diagram of a computer-implemented method for vehicle ambient lighting, according to one aspect. The computer-implemented method for vehicle ambient lighting may include rendering 702 a vehicle ambient lighting interface via the touchscreen 150 in circular, revolving fashion, rendering 704 a gap between a first vehicle ambient lighting mode and a last vehicle ambient lighting mode of two or more vehicle ambient lighting modes, implementing 706 a currently selected vehicle ambient lighting mode via a lighting system 182, receiving 708 a user input via the touchscreen 150, and rendering 710 a changing of the currently selected vehicle ambient lighting mode from the first vehicle ambient lighting mode to a second vehicle ambient lighting mode based on the received user input, and implementing the updated currently selected vehicle ambient lighting mode via the lighting system 182.

Figure 8:
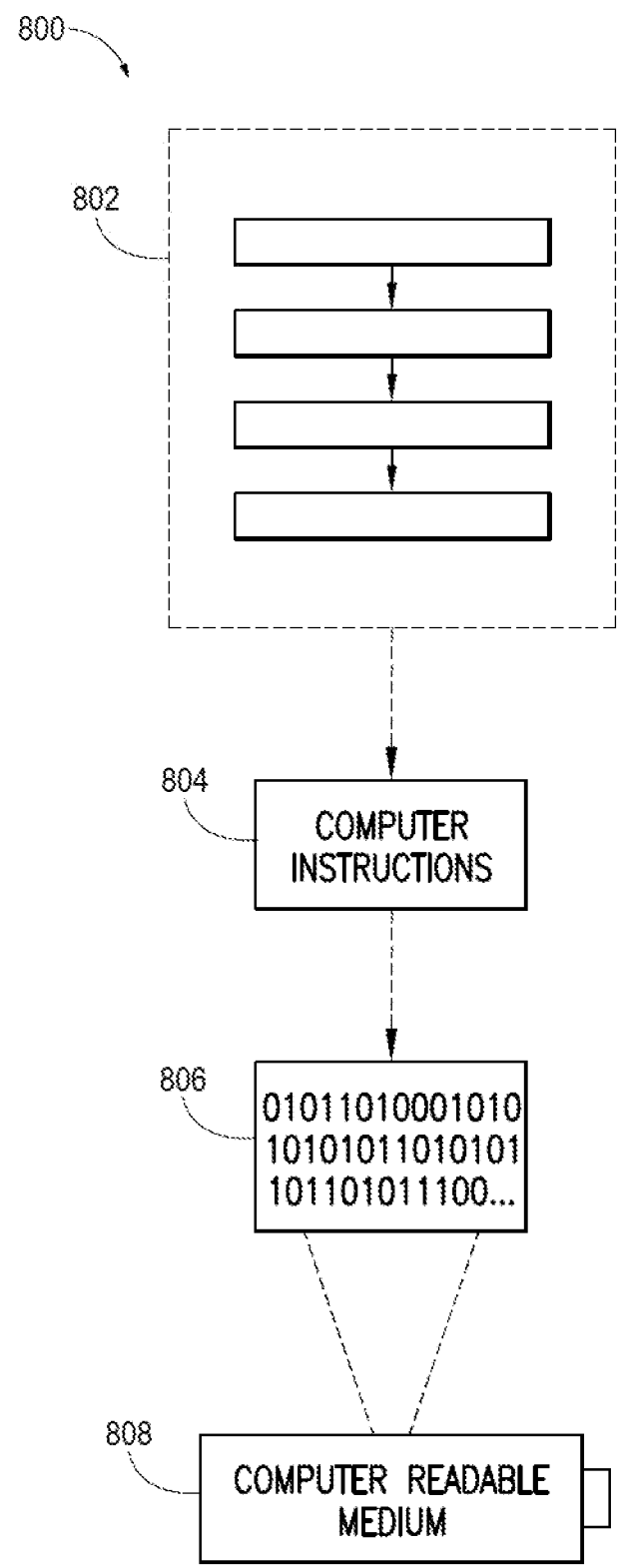
FIG. 8 is an illustration of an example computer-readable medium or computer-readable device including processor-executable instructions configured to embody one or more of the provisions set forth herein, according to one aspect.

Still another aspect involves a computer-readable medium including processor-executable instructions configured to implement one aspect of the techniques presented herein. An aspect of a computer-readable medium or a computer-readable device devised in these ways is illustrated in FIG. 8, wherein an implementation 800 includes a computer-readable medium 808, such as a CD-R, DVD-R, flash drive, a platter of a hard disk drive, etc., on which is encoded computer-readable data 806. This encoded computer-readable data 806, such as binary data including a plurality of zero's and one's as shown in 806, in turn includes a set of processor-executable computer instructions 804 configured to operate according to one or more of the principles set forth herein. In this implementation 800, the processor-executable computer instructions 804 may be configured to perform a method 802, such as the method 700 of FIG. 7. In another aspect, the processor-executable computer instructions 804 may be configured to implement a system, such as the system 100 of FIG. 1. Many such computer-readable media may be devised by those of ordinary skill in the art that are configured to operate in accordance with the techniques presented herein.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processing unit, an object, an executable, a thread of execution, a program, or a computer. By way of illustration, both an application running on a controller and the controller may be a component. One or more components residing within a process or thread of execution and a component may be localized on one computer or distributed between two or more computers.

Further, the claimed subject matter is implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Figure 9:
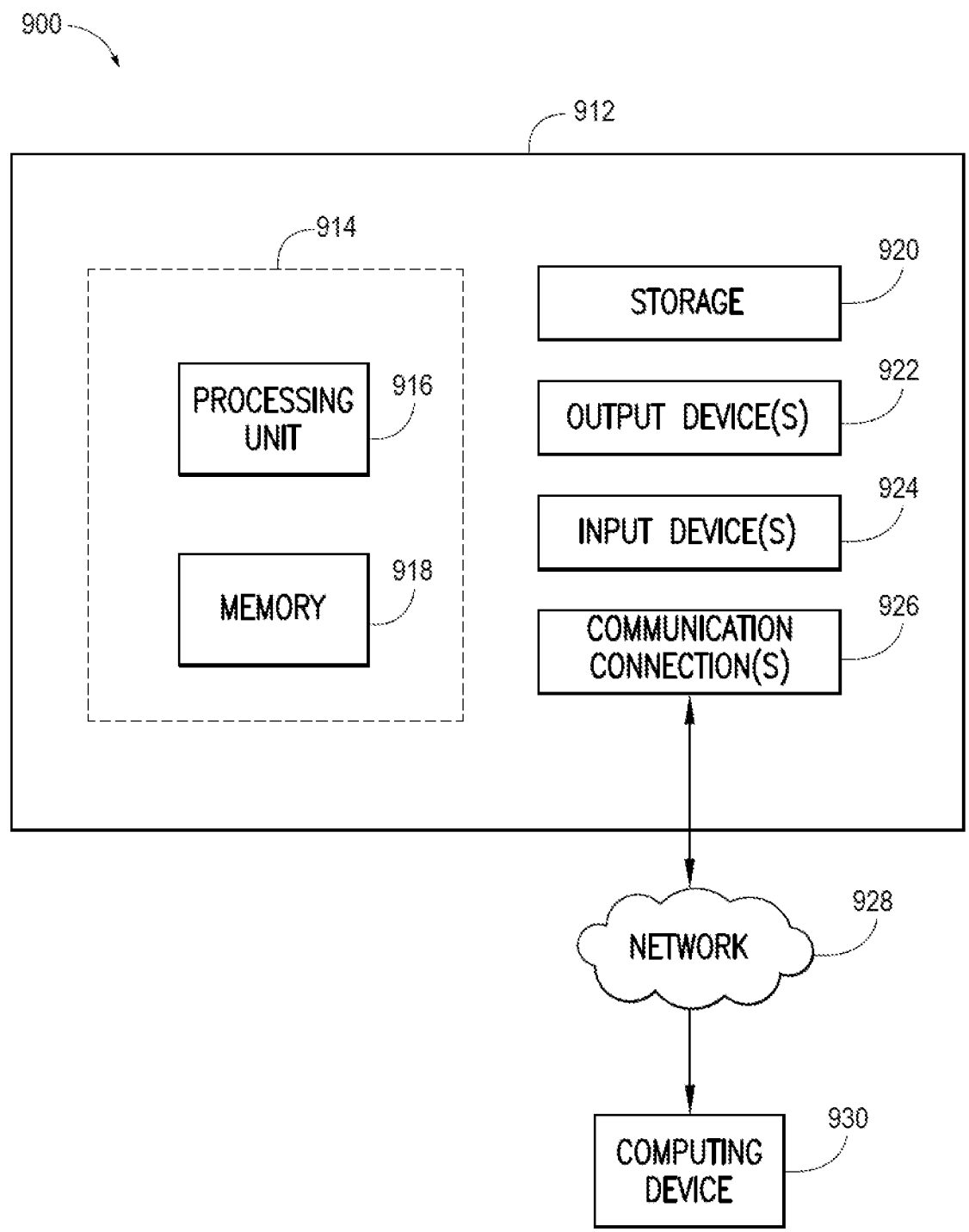
FIG. 9 is an illustration of an example computing environment where one or more of the provisions set forth herein are implemented, according to one aspect.

FIG. 9 and the following discussion provide a description of a suitable computing environment to implement aspects of one or more of the provisions set forth herein. The operating environment of FIG. 9 is merely one example of a suitable operating environment and is not intended to suggest any limitation as to the scope of use or functionality of the operating environment. Example computing devices include, but are not limited to, personal computers, server computers, hand-held or laptop devices, mobile devices, such as mobile phones, Personal Digital Assistants (PDAs), media players, and the like, multiprocessor systems, consumer electronics, mini computers, mainframe computers, distributed computing environments that include any of the above systems or devices, etc.

Generally, aspects are described in the general context of "computer readable instructions" being executed by one or more computing devices. Computer readable instructions may be distributed via computer readable media as will be discussed below. Computer readable instructions may be implemented as program modules, such as functions, objects, Application Programming Interfaces (APIs), data structures, and the like, that perform one or more tasks or implement one or more abstract data types. Typically, the functionality of the computer readable instructions are combined or distributed as desired in various environments.

FIG. 9 illustrates a system 900 including a computing device 912 configured to implement one aspect provided herein. In one configuration, the computing device 912 includes at least one processor or processing unit 916 and memory 918. Depending on the exact configuration and type of computing device, memory 918 may be volatile, such as RAM, non-volatile, such as ROM, flash memory, etc., or a combination of the two. This configuration is illustrated in FIG. 9 by dashed line 914.

In other aspects, the computing device 912 includes additional features or functionality. For example, the computing device 912 may include additional storage such as removable storage or non-removable storage, including, but not limited to, magnetic storage, optical storage, etc. Such additional storage is illustrated in FIG. 9 by storage 920. In one aspect, computer readable instructions to implement one aspect provided herein are in storage 920. Storage 920 may store other computer readable instructions to implement an operating system, an application program, etc. Computer readable instructions may be loaded in memory 918 for execution by processing unit 916, for example.

The term "computer readable media" as used herein includes computer storage media. Computer storage media includes volatile and nonvolatile, removable and non-removable media implemented in any method or technology for storage of information such as computer readable instructions or other data. Memory 918 and storage 920 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which may be used to store the desired information and which may be accessed by the computing device 912. Any such computer storage media is part of the computing device 912.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

The computing device 912 includes input device(s) 924 such as keyboard, mouse, pen, voice input device, touch input device, infrared cameras, video input devices, or any other input device. Output device(s) 922 such as one or more displays, speakers, printers, or any other output device may be included with the computing device 912. Input device(s) 924 and output device(s) 922 may be connected to the computing device 912 via a wired connection, wireless connection, or any combination thereof. In one aspect, an input device or an output device from another computing device may be used as input device(s) 924 or output device(s) 922 for the computing device 912. The computing device 912 may include communication connection(s) 926 to facilitate communications with one or more other devices 930, such as through network 928, for example.

Although the subject matter has been described in language specific to structural features or methodological acts, it is to be understood that the subject matter of the appended claims is not necessarily limited to the specific features or acts described above. Rather, the specific features and acts described above are disclosed as example aspects.

Various operations of aspects are provided herein. The order in which one or more or all of the operations are described should not be construed as to imply that these operations are necessarily order dependent. Alternative ordering will be appreciated based on this description. Further, not all operations may necessarily be present in each aspect provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising", "comprises", "including", "includes", or the like generally means comprising or including, but not limited to.

It will be appreciated that various of the above-disclosed and other features and functions, or alternatives or varieties thereof, may be desirably combined into many other different systems or applications. Also, that various presently unforeseen or unanticipated alternatives, modifications, variations or improvements therein may be subsequently made by those skilled in the art which are also intended to be encompassed by the following claims.

The invention claimed is:

1. A system for vehicle ambient lighting, comprising:
a touchscreen;
a lighting system;
a memory storing one or more instructions; and
a processor executing one or more of the instructions stored on the memory to perform:
rendering a vehicle ambient lighting interface via the touchscreen,
wherein the vehicle ambient lighting interface includes two or more vehicle ambient lighting modes and a currently selected vehicle ambient lighting mode from the two or more vehicle ambient lighting modes; and
implementing the currently selected vehicle ambient lighting mode via the lighting system, wherein the two or more vehicle ambient lighting modes of the vehicle ambient lighting interface are rendered in a circular, revolving fashion during selection.

2. The system for vehicle ambient lighting of claim 1, wherein a gap is rendered between a first vehicle ambient lighting mode and a last vehicle ambient lighting mode of the two or more vehicle ambient lighting modes.

3. The system for vehicle ambient lighting of claim 1, wherein the lighting system includes a direct lighting system and an indirect lighting system.

4. The system for vehicle ambient lighting of claim 3, wherein the currently selected vehicle ambient lighting mode implements a first color for the direct lighting system and a second color for the indirect lighting system.

5. The system for vehicle ambient lighting of claim 1, wherein the touchscreen receives a user input and the processor changes the currently selected vehicle ambient lighting mode from a first vehicle ambient lighting mode to a second vehicle ambient lighting mode based on the user input.

6. The system for vehicle ambient lighting of claim 5, wherein the user input is a swipe gesture, a selection of an arrow graphic element, or a selection of a second vehicle ambient lighting mode graphic element.

7. The system for vehicle ambient lighting of claim 1, wherein the touchscreen receives a user input and processor changes the currently selected vehicle ambient lighting mode from a first vehicle ambient lighting mode to a third vehicle ambient lighting mode based on the user input.

8. The system for vehicle ambient lighting of claim 7, wherein the user input is a hold and drag gesture or a hold selection of an arrow graphic element.

9. The system for vehicle ambient lighting of claim 7, wherein a first vehicle ambient lighting mode graphic element corresponding to the first vehicle ambient lighting mode is non-adjacent to a third vehicle ambient lighting mode graphic element corresponding to the third vehicle ambient lighting mode.

10. The system for vehicle ambient lighting of claim 1, wherein the touchscreen receives a user input, the user input is a hold gesture, and a non-currently selected vehicle ambient lighting mode of the two or more vehicle ambient lighting modes changes is rendered by the processor to be shrunk in size relative to the currently selected vehicle ambient lighting mode until the hold gesture is released.

11. A computer-implemented method for vehicle ambient lighting, comprising:
rendering a vehicle ambient lighting interface via a touchscreen, wherein the vehicle ambient lighting interface includes two or more vehicle ambient lighting modes and a currently selected vehicle ambient lighting mode from the two or more vehicle ambient lighting modes;
rendering the two or more vehicle ambient lighting modes of the vehicle ambient lighting interface in a circular, revolving fashion during selection; and
implementing the currently selected vehicle ambient lighting mode via a lighting system.

12. The computer-implemented method for vehicle ambient lighting of claim 11, comprising rendering a gap between a first vehicle ambient lighting mode and a last vehicle ambient lighting mode of the two or more vehicle ambient lighting modes.

13. The computer-implemented method for vehicle ambient lighting of claim 11, comprising implementing the currently selected vehicle ambient lighting mode via a direct lighting system and an indirect lighting system of the lighting system.

14. The computer-implemented method for vehicle ambient lighting of claim 13, comprising implementing a first color for the direct lighting system and a second color for the indirect lighting system.

15. The computer-implemented method for vehicle ambient lighting of claim 11, comprising:
receiving a user input via the touchscreen; and
rendering a changing of the currently selected vehicle ambient lighting mode from a first vehicle ambient lighting mode to a second vehicle ambient lighting mode based on the user input.

16. A system for vehicle ambient lighting, comprising:
a memory storing one or more instructions; and
a processor executing one or more of the instructions stored on the memory to perform:
rendering a vehicle ambient lighting interface via a touchscreen,
wherein the vehicle ambient lighting interface includes two or more vehicle ambient lighting modes and a currently selected vehicle ambient lighting mode from the two or more vehicle ambient lighting modes; and
implementing the currently selected vehicle ambient lighting mode via a lighting system,
wherein the two or more vehicle ambient lighting modes of the vehicle ambient lighting interface are rendered in a circular, revolving fashion during selection.

17. The system for vehicle ambient lighting of claim 16, wherein a gap is rendered between a first vehicle ambient lighting mode and a last vehicle ambient lighting mode of the two or more vehicle ambient lighting modes.

18. The system for vehicle ambient lighting of claim 16, wherein the lighting system includes a direct lighting system and an indirect lighting system.

* * * * *